United States Patent [19]

Henkel et al.

[11] Patent Number: 5,667,330

[45] Date of Patent: Sep. 16, 1997

[54] QUICK-CONNECT MECHANISM FOR RELEASABLY RETAINING A POWER TAKE-OFF SHAFT WITHIN AN OUTPUT SHAFT HUB

[75] Inventors: Edmund R. Henkel, Naperville; Donald E. Rieser, Riverside, both of Ill.

[73] Assignee: Case Corporation, Racine, Wis.

[21] Appl. No.: 563,468

[22] Filed: Nov. 28, 1995

[51] Int. Cl.$^6$ .............................. A01B 71/06; B60K 17/28
[52] U.S. Cl. ................. 403/328; 403/359; 74/15.69; 74/15.66; 74/15.2
[58] Field of Search ................. 403/359, 328, 403/327, 1; 74/15.2, 15.4, 15.6, 15.66, 15.86, 11, 15.69

[56] References Cited

U.S. PATENT DOCUMENTS

| | | | |
|---|---|---|---|
| 3,513,712 | 5/1970 | Zajichek et al. | 74/15.2 |
| 3,551,013 | 12/1970 | Trojanowski et al. | 403/359 X |
| 3,561,277 | 2/1971 | Boyle et al. | 74/15.4 |
| 3,715,704 | 2/1973 | Boyle et al. | 74/15.4 |
| 3,734,515 | 5/1973 | Dudek | 403/359 X |
| 3,747,966 | 7/1973 | Wilkes et al. | 403/322 |
| 3,991,629 | 11/1976 | Dearnley | 74/15.4 |
| 4,271,942 | 6/1981 | Ballendux | 192/48.91 |
| 4,287,778 | 9/1981 | Quick | 74/15.4 |
| 4,435,990 | 3/1984 | Chalmers | 74/15.63 |
| 4,463,696 | 8/1984 | Steckenrider | 112/200 |
| 4,546,661 | 10/1985 | Weis et al. | 74/15.4 |
| 4,685,340 | 8/1987 | Shust et al. | 74/11 |
| 4,776,226 | 10/1988 | Zenker | 74/15.4 |
| 4,859,110 | 8/1989 | Dommel | 403/325 |
| 4,900,181 | 2/1990 | Geisthoff | 403/328 X |
| 4,957,387 | 9/1990 | Nasu | 403/359 X |
| 4,960,344 | 10/1990 | Geisthoff et al. | 403/316 |

FOREIGN PATENT DOCUMENTS 316589 12/1971 U.S.S.R. .................. 74/15.69

OTHER PUBLICATIONS

"Reversible PTO Shaft" product brochure (Mar. 1992).

*Primary Examiner*—Anthony Knight
*Attorney, Agent, or Firm*—Rudnick & Wolfe

[57] ABSTRACT

A locking mechanism for releasably fixing an externally splined power take-off shaft to an output shaft of off-highway equipment such as a tractor. The output shaft has a hollow, internally splined hub portion adapted to axially receive the externally splined power take-off shaft to prevent relative rotational movement between the power take-off and output shafts. The locking mechanism includes a locking member guided within a radial opening on the output shaft so as to be radially movable between an inner locking position and an outer unlocking position. In the inner locking position, the locking member is engageable with a recess formed on the power take-off shaft to prevent relative axial movement between the power take-off shaft and the output shaft. In the outer unlocking position, the locking member is disengaged from the recess in the output shaft to permit such relative axial movement. An actuator is positioned about an exterior of the output shaft and is movable between a first position in which the actuator operably maintains the locking member in its locking position, and a second position which permits radial movement of the locking member to its unlocking position.

24 Claims, 6 Drawing Sheets

QUICK-CONNECT MECHANISM FOR RELEASABLY RETAINING A POWER TAKE-OFF SHAFT WITHIN AN OUTPUT SHAFT HUB

FIELD OF THE INVENTION

The present invention relates generally to a two-speed drive power take-off assembly for an agricultural tractor, and more particularly, to a locking mechanism for releasably fixing reversible power take-off shafts to an output shaft which is selectively driven at two different speeds via mechanical gearing.

BACKGROUND OF THE INVENTION

Utilization of a power take-off (PTO) shaft on equipment such as a tractor or the like to power associated agricultural implements is commonly known in the industry. Typically, the PTO shaft is coupled to an output shaft which is selectively driven through mechanical gearing at standardized speeds of either 540 rpm or 1000 rpm. The PTO shaft is configured for connection to an implement which is also designed to be operated at either 540 rpm or 1000 rpm.

In order to avoid connecting to implements for operation at the wrong speed, the power take-off shaft is typically configured with a standard 1⅜ inch diameter connection having six splines for connecting to 540 rpm implements, and/or 21-splines for connecting to 1000 rpm implements. Alternatively, some PTO shafts are configured with a standard 1¾ inch diameter connection having 20 splines for connecting to 1000 rpm implements with similarly configured coupling mechanisms.

Thus, in order to accommodate the requirements of a particular implement, it is necessary to provide a power take-off assembly which allows quick and easy conversion to the desired PTO shaft configuration and associated speed of operation.

Various mechanisms have been employed for converting to a desired PTO shaft configuration and associated speed of operation. Some prior art devices utilize interchangeable PTO shafts having either six tooth or 21 tooth splines for connection to an associated implement. Other devices utilize a single reversible PTO shaft having six tooth and 20 tooth spline ends extending in opposite axial directions. In either configuration, the desired PTO shaft speed is typically determined by the configuration of the PTO shaft inserted into the output shaft. When reversible PTO shafts are used, the outer end portion is adapted for engagement with the implement for the selected speed, while the configuration of the inner end portion positions a shifting mechanism against the force of a spring to selectively engage the proper speed drive gear. For example, if it is desired to operate at a speed of 540 rpm, the PTO shaft is inserted so that the outer end portion is a six-spline connection, and the inner end portion has a configuration which positions the shifting mechanism to selectively engage the 540 rpm gear.

The PTO shafts in these devices are often maintained in place by a flanged locking mechanism arranged externally of the output shaft to which the PTO shaft is coupled. One disadvantage of the PTO shafts with connecting flanges is that it tends to be tedious and time consuming to connect the flange to the output shaft by bolts or the like.

Other known PTO shafts are maintained in place by an internal snap-ring configured to engage an interior bore of the output shaft. Because of the high force required to compress the snap-ring for installation, special tools such as pliers are usually required to interchange the PTO shaft, which tends to be cumbersome and time consuming. The snap-ring installation is made even more difficult when installing the PTO shaft in the 1000 rpm position. To perform this installation, an operator must push the PTO shaft to overcome the high axial force of the spring-loaded shifting mechanism, and at the same time install the snap-ring. In addition, the location of the snap-ring may add to these difficulties because it is exposed to debris, especially in the dirt and mud-filled environment of a farming field, thus making it difficult to properly use the tools. Moreover, the snap-ring connection may not be secure enough to adequately retain the PTO shaft during high speed operation. As will be appreciated by those skilled in the art, the PTO shaft is subjected to axial forces during operation of the agricultural implement. Accordingly, the snap-rings used to releasably fasten the PTO shaft in place may have insufficient strength to retain the PTO shaft in place.

It therefore remains desirable to provide a simple locking mechanism for quickly and securely connecting the PTO shaft to the output shaft in a desired orientation without the use of tools.

SUMMARY OF THE INVENTION

In view of the above, and in accordance with one aspect of the present invention, there is provided a locking mechanism for releasably fixing an externally splined power take-off shaft to an output shaft of off-highway equipment such as a tractor. The output shaft has a hollow, internally splined hub portion adapted to axially receive the externally splined power take-off shaft to prevent relative rotational movement between the power take-off and output shafts. The locking mechanism includes a locking member guided within a radial opening in the output shaft so as to be radially movable between an inner locking position and an outer unlocking position. In the inner locking position, the locking member is engageable with a recess formed in the power take-off shaft to prevent relative axial movement between the power take-off shaft and the output shaft. In the outer unlocking position, the locking member is disengaged from said recess in the power take-off shaft to permit such relative axial movement. An actuator is positioned about an exterior of the output shaft and is movable between a first position in which it operably maintains the locking member in the locking position, and a second position which permits radial movement of the locking member to the unlocking position. Return of the actuator to the first position causes it to operably engage the locking member to move the locking member to its locked position.

In a preferred embodiment of the invention, the recess in the PTO shaft is defined as an annular groove located on a center portion of the PTO shaft. Also preferably, the locking member comprises three circumferentially spaced locking balls supported within respective equally spaced radial openings in the output shaft. In operation, the locking balls are simultaneously radially movable between the inner locking position and the outer unlocking position. In the inner locking position, the locking balls engage the groove in the PTO shaft to prevent relative axial movement between the PTO shaft and the output shaft. In the outer unlocking position, the locking balls are disengaged from the groove to permit such relative axial movement.

Preferably, the actuator comprises an axially movable annular collar surrounding the output shaft and biased by a spring toward the first position in which the locking balls are in their inner locking positions. In a most preferred embodiment, the spring is disposed about a distal portion of the output shaft and is surrounded by an annular enclosure to protect the locking mechanism from debris in the outside environment. The annular enclosure preferably includes a proximal portion connected to the annular collar, and a distal portion adapted to slidably engage an exterior surface of the output shaft. The spring is interposed between the distal portion of the annular enclosure and a proximally located spring retaining member on the output shaft. Thus, axial movement of the actuator from the first to the second position causes slidable movement of the annular enclosure along the output shaft and against the force of the spring. Preferably, the spring retaining member acts as a proximal stop for limiting sliding movement of the annular enclosure in a proximal direction. In addition, a distal retaining member is provided on the output shaft for limiting sliding movement of the annular enclosure in a distal direction.

The present invention provides significant advantages over other power take-off units. One advantage is the ability to quickly and easily remove the power take-off shaft without the use of tools by merely pushing the annular collar or spring annular enclosure axially and pulling the power take-off shaft from the output shaft. The other end of the PTO shaft can be just as easily and quickly inserted and securely locked within the output shaft. In addition, the configuration of the reversible PTO shaft provides a fast and reliable way to automatically shift between high and low operating speeds.

The present invention, together with further objects and advantages, will be best understood by reference to the following detailed description taken in conjunction with the accompanying drawings.

BRIEF DESCRIPTION OF THE DRAWINGS

FIG. 2A is a cross-sectional view taken along the line 2A—2A in FIG. 2 and showing locking balls in the radially inward locking position;

FIG. 3A is a cross-sectional view of the power takeoff shaft taken along the line 3A—3A in FIG. 3;

DETAILED DESCRIPTION OF THE PREFERRED EMBODIMENT

Figure 1:
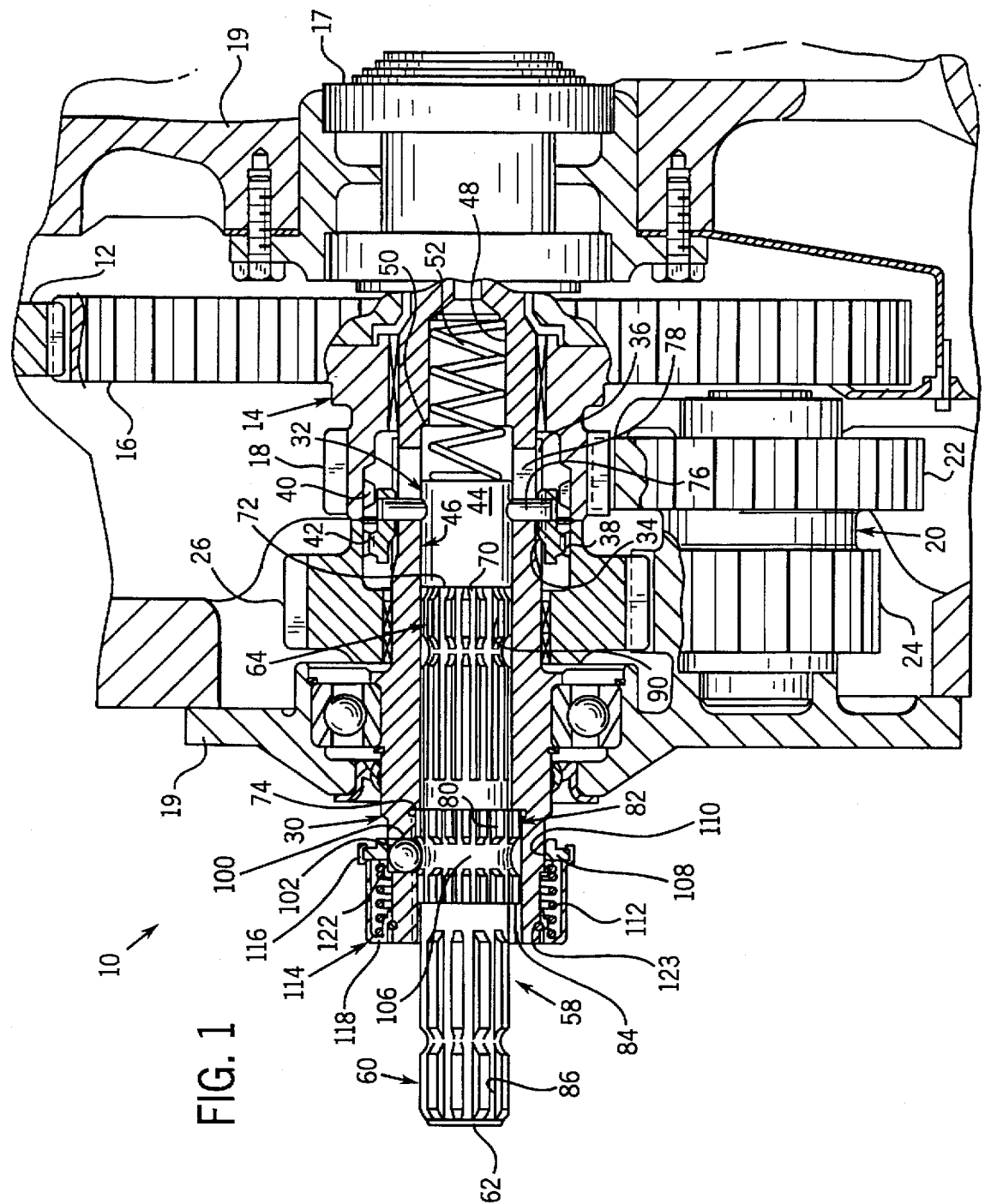
FIG. 1 is a partial cross-sectional view of a power take-off unit showing a reversible power take-off shaft in a locked position and oriented for operation at 540 RPM.

While the present invention is susceptible of embodiments in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Referring now to the drawings, wherein like reference numerals refer to like parts throughout the several views, there is shown in FIG. 1 a power take-off assembly 10. The engine of a tractor drives the system through an engine clutch and a drive shaft (not shown). When the engine clutch is engaged, a drive gear 12 drives a high speed cluster gear 14 including gears 16 and 18 at a constant speed of about 1000 rpm. The high speed cluster gear 14 is rotatably supported in a bearing assembly 17 in a power take-off housing 19.

An intermediate cluster gear 20 having an axis parallel to that of the high speed cluster gear 14 is also rotatably mounted in the housing 19. The intermediate cluster gear 20 includes gears 22 and 24 of which gear 22 is driven by gear 18 of the high speed cluster gear 14. Thus, the high speed cluster gear 14 is driven through gear 16, which in turn drives gear 22 of the intermediate cluster gear 20 through gear 18. The gear 24 of the intermediate cluster gear 20 drives a low speed gear 26 which results in a 540 rpm operating speed. The low speed gear 26 is rotatably mounted to an output shaft 30 and is adjacent to and in axial alignment with the high speed gear 18. When the engine clutch is engaged, the high speed gear 18 of cluster gear 14 and the low speed gear 26 are continuously driven such that either can provide rotatable power to drive the power take-off assembly 10.

Figure 2:
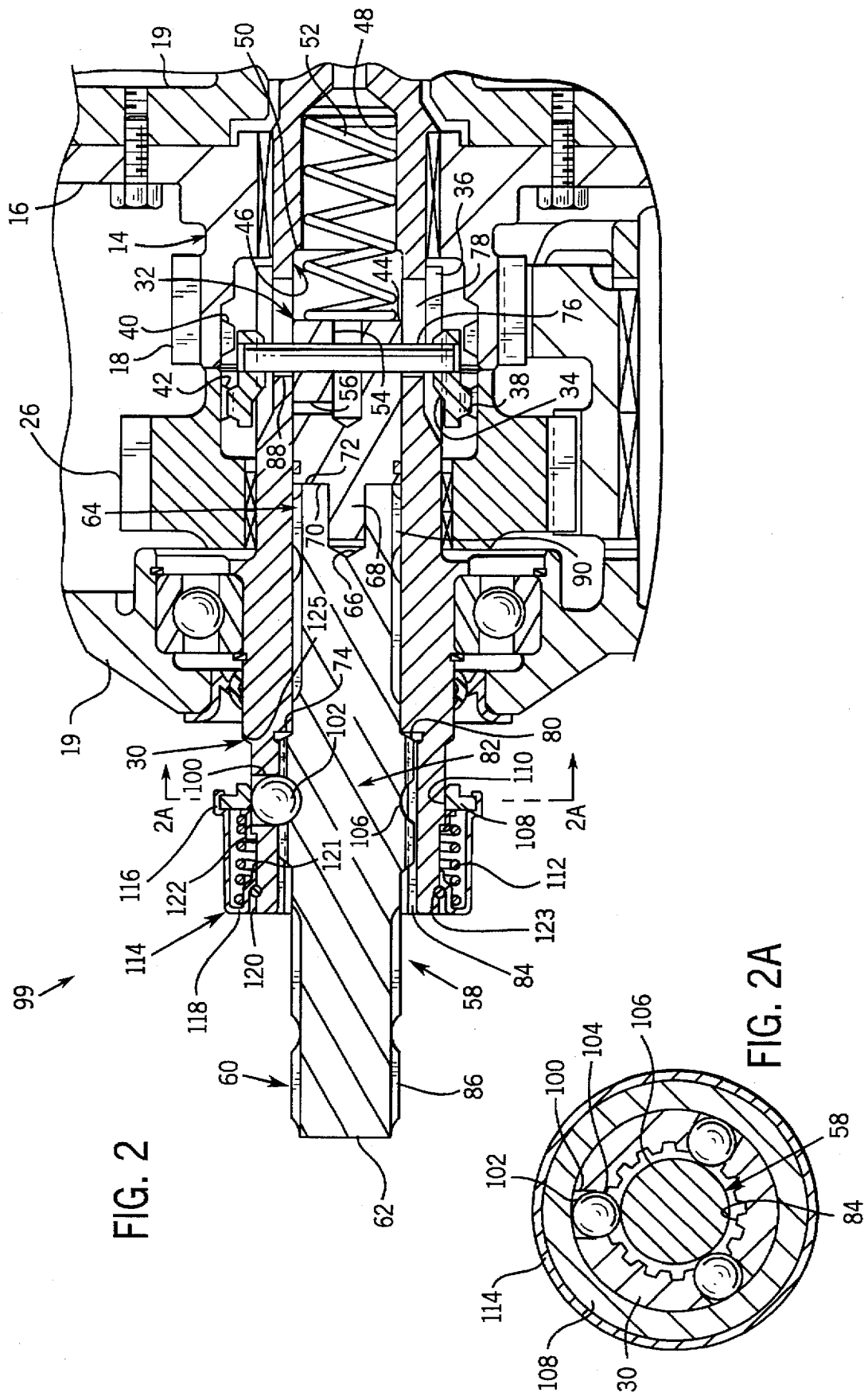
FIG. 2 is an enlarged cross-sectional view of the power take-off unit shown in FIG. 1 illustrating the locking mechanism of the present invention and showing a locking ball in a radially inward locking position and a shift collar in engagement with a 540 RPM gear.

As shown in FIG. 2, a distal end portion of the output shaft 30 is rotatably mounted within the housing 19 and a proximal end portion is supported within the high speed cluster gear 14. To selectively engage one of the gears 14, 26 to positively drive the output shaft 30, an axially shiftable clutch collar 32 is carried by the output shaft 30. The clutch collar 32 has internal spline teeth 34 forming a sliding spline connection with external spline teeth 36 on the output shaft 30. The clutch collar 32 also has external clutch teeth 38 adapted to operably engage internal clutch teeth 40 or 42 on the respective high and low speed gears 18 and 26. Thus, the clutch collar 32 can be displaced axially so that either the high speed gear 18 or low speed gear 26 drives the output shaft 30 at 1000 rpm or 540 rpm respectively. As will be appreciated by those skilled in the art, the clutch collar 32 can be configured so that the internal teeth 34 are in general alignment with the external teeth 38 rather than being offset as shown in FIGS. 2–6.

To move the clutch collar 32 into engagement with the desired speed gear, the clutch collar 32 is preferably configured with a cylindrical piston 44 which is slidably positioned within a hollow hub portion 46 of the output shaft 30. In the illustrated embodiment, the hollow hub portion 46 of shaft 30 includes a reduced diameter spring chamber 48 formed in a proximal end thereof. The hub portion 46 and spring chamber 48 define a radial step or shoulder 50 therebetween which limits axial movement of the clutch collar 32 if the piston 44 is forced against the shoulder 50. As seen in FIG. 2, the clutch collar 32 is biased in a distal or leftward direction by a spring 52 which is positioned within the cheer 48 and acts against the piston 44 of the clutch collar 32. In a preferred embodiment, a longitudinal passage 54 and radial passageway 56 are formed in the piston 44 of the clutch collar 32 for receiving lubricating fluid through the spring chamber 48 of the output shaft 30.

The position of the clutch collar 32 is selectively determined by the configuration of a reversible PTO shaft 58 which is axially received within the hollow hub portion 46 of the output shaft 30. Preferably, the PTO shaft 58 has one end portion 60 with a blunt end 62 for placing the clutch collar 32 into engagement with the high speed gear 18, and an opposite end portion 64 configured with a cavity 66 for placing the clutch collar 32 into engagement with the low speed gear 26.

To position the clutch collar 32 into engagement with the low speed gear 26 as shown in FIGS. 1 and 2, the end portion 64 of the PTO shaft 58 is inserted into the output shaft 30 so that the cavity 66 receives an extension 68 projecting axially from the piston 44 of the clutch collar 32 toward the distal or left end of shaft 30. Thus, a proximal or right end 70 of the PTO shaft 58 bears against a shoulder 72 of the piston 44 to maintain the spring-biased clutch collar 32 in position to drive the output shaft 30 at 540 rpm. During insertion of the PTO shaft 58 into the output shaft 30, an intermediate shoulder 74 of the output shaft 30 limits the rightward axial movement of the PTO shaft 58. As will be discussed in more detail below, a locking mechanism 99 is provided for automatically locking the PTO shaft 58 into the locking position shown in FIGS. 1 and 2, thereby securely maintaining the clutch collar 32 in the desired position for engagement with the low speed gear 26. In addition, the axial movement of the clutch collar 32 is further limited in each axial direction by a slide pin 76 extending from the piston 44. The slide pin 76 is axially slideable in a pair of longitudinal slots 78 formed in the output shaft 30.

Figure 3:
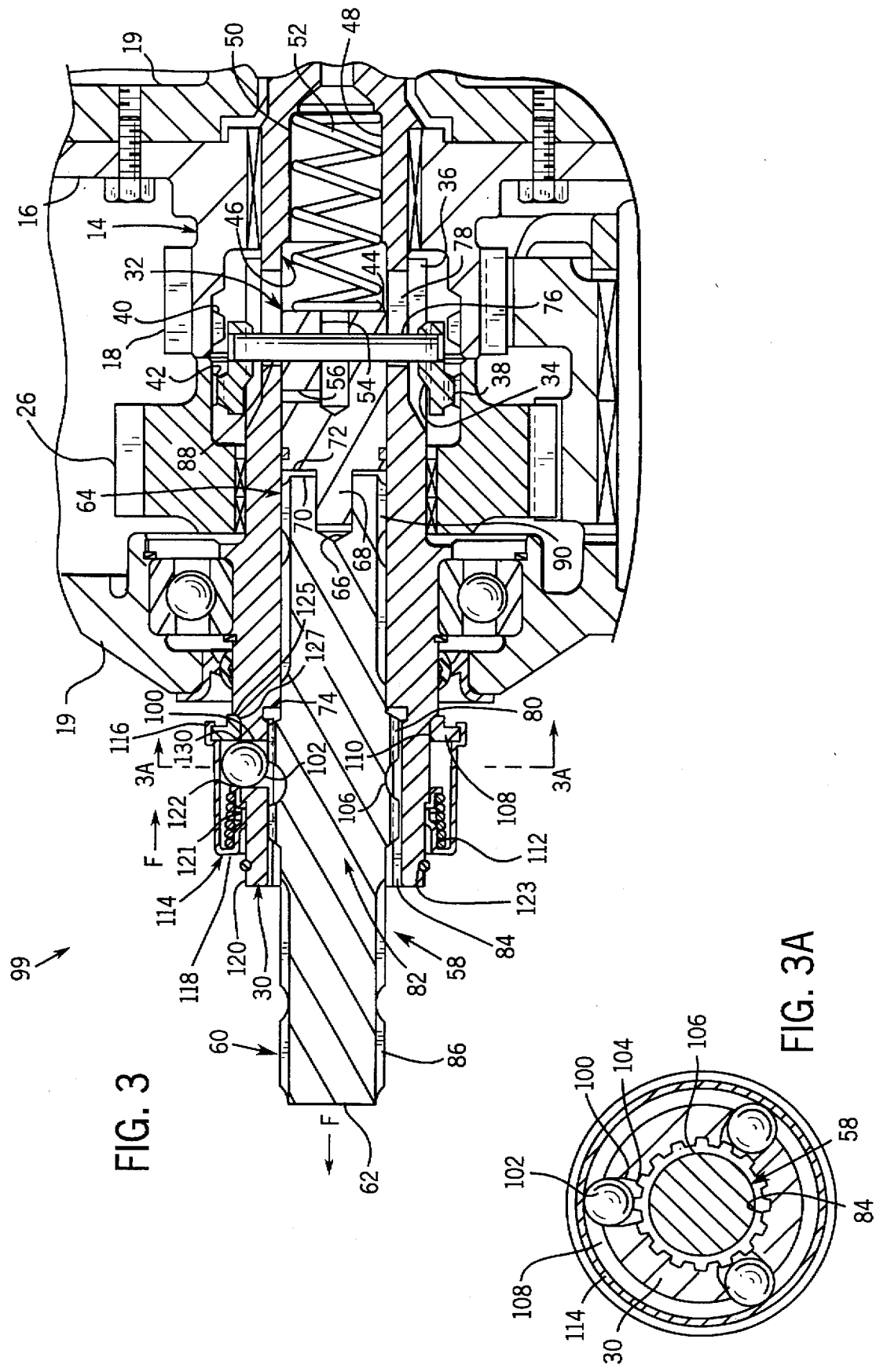
FIG. 3 is the cross-sectional view of the power takeoff unit shown in FIG. 2 and illustrating the locking balls of the present invention in a radially outward unlocking position.

As shown in FIGS. 1-3, the PTO shaft 58 has external splines 80 on a center section 82 which form a sliding spline connection with internal splines 84 on the output shaft 30 to prevent relative rotational movement between the PTO shaft 58 and output shaft 30. Preferably, the external splines 80 and internal splines 84 provide a six-spline connection such that the PTO shaft 58 rotates with the output shaft 30. The distal end portion 60 of the PTO shaft 58 illustrated in FIGS. 1-3 is also configured with six external splines 86 for connecting to an implement that is adapted to be operated at 540 rpm.

Figure 4:
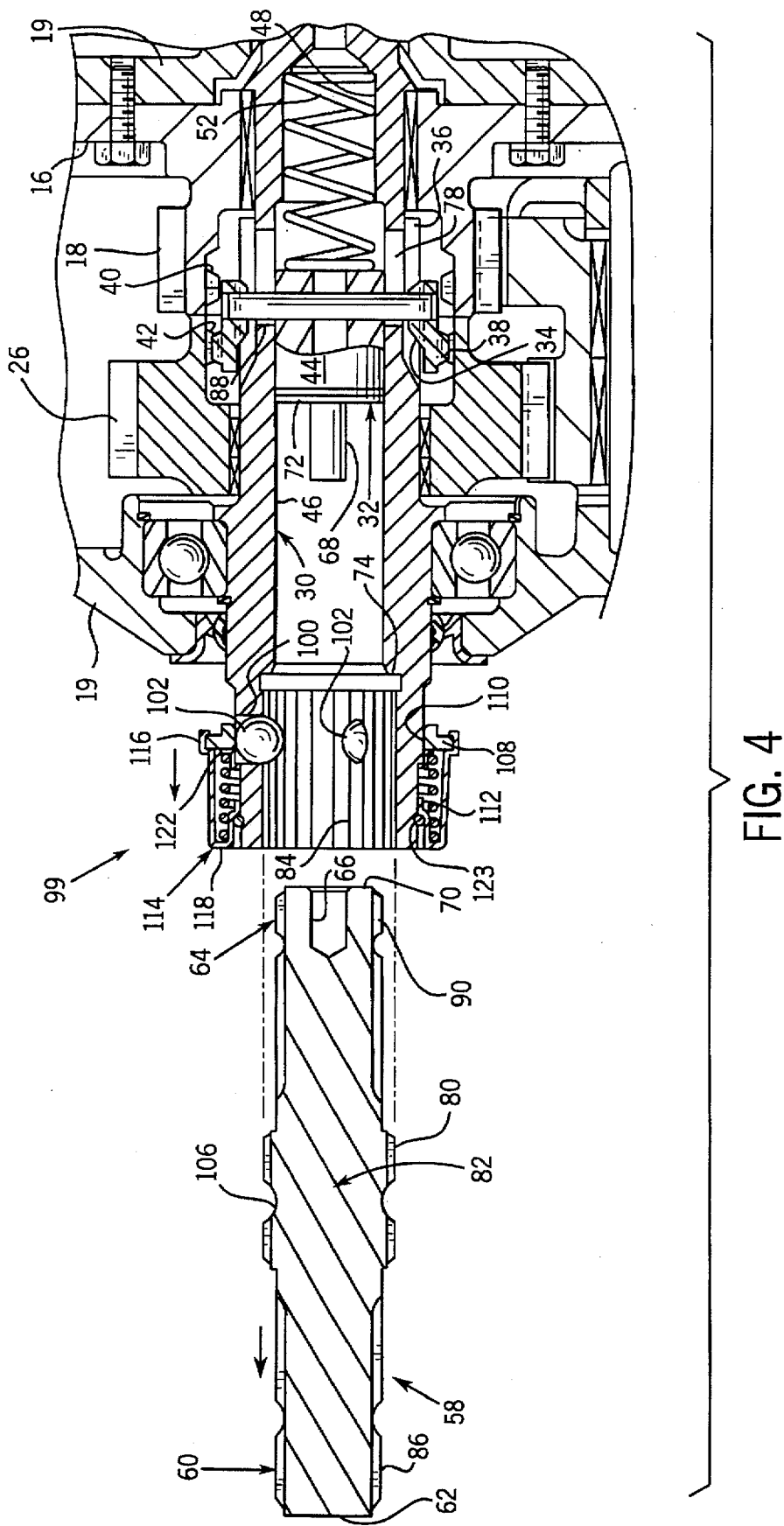
FIG. 4 is a cross-sectional view of the power takeoff unit showing the power take-off shaft assembly removed from the output shaft.
Figure 5:
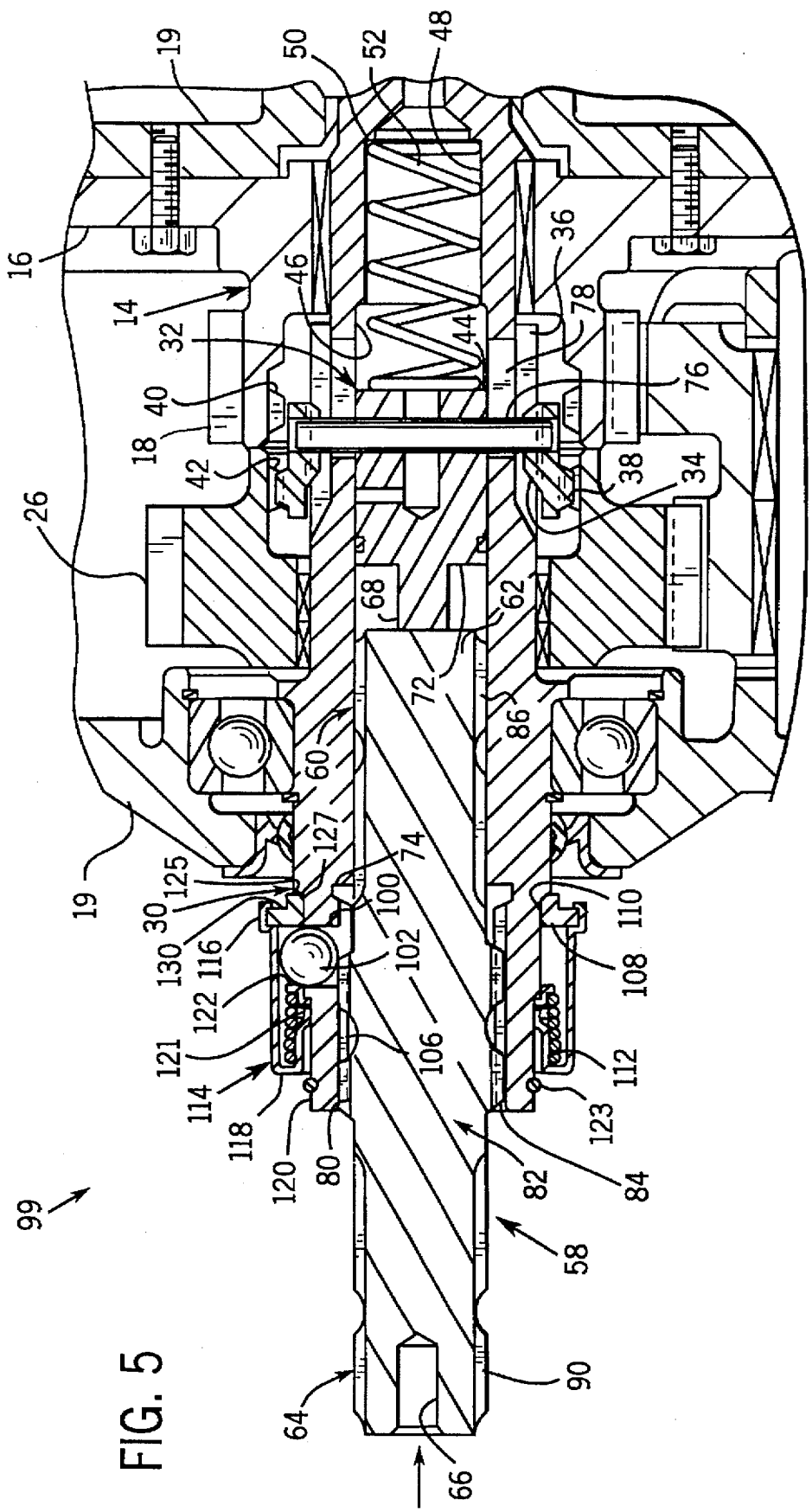
FIG. 5 is a cross-sectional view of the power takeoff unit showing the power take-off shaft being inserted in the opposite orientation within the output shaft.
Figure 6:
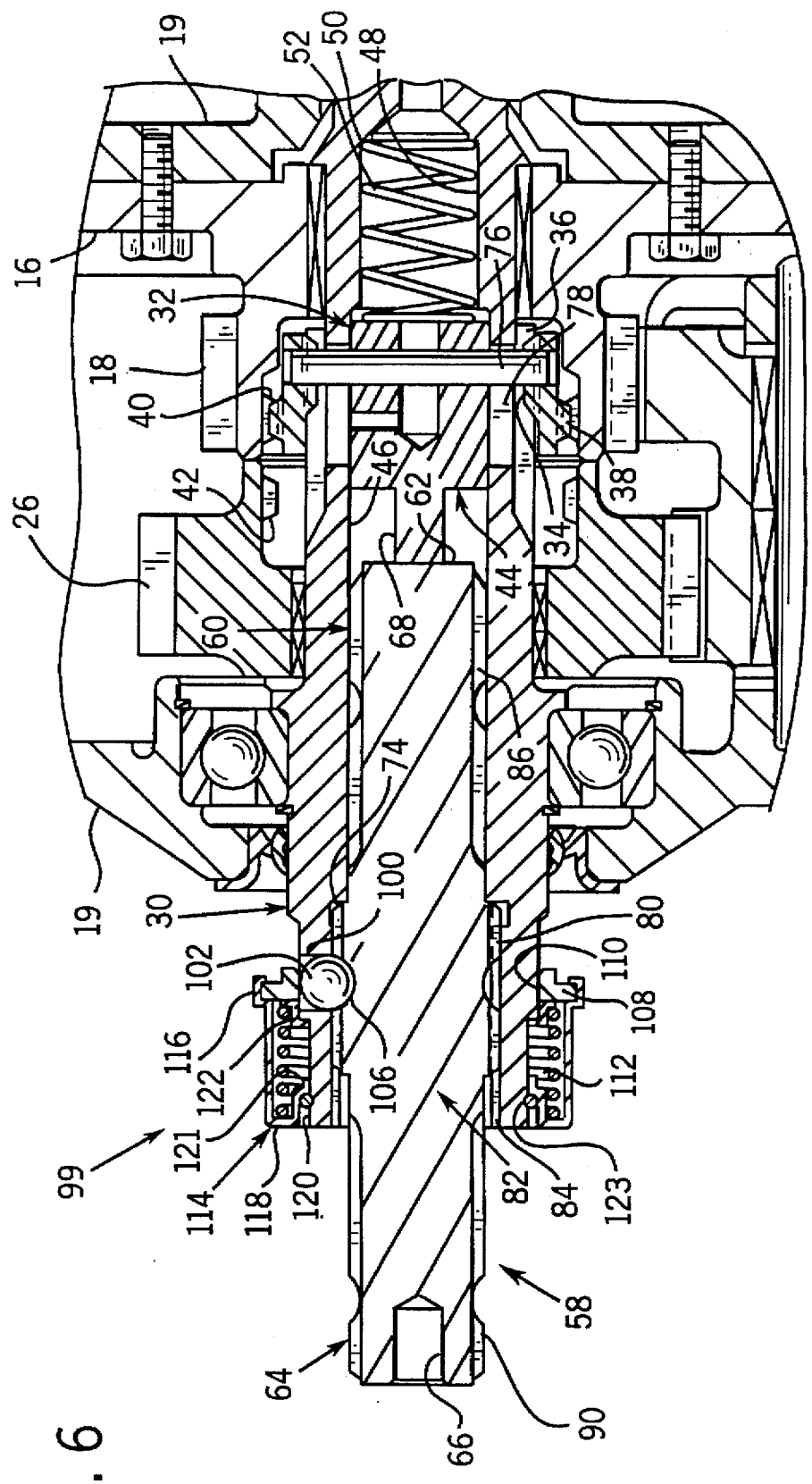
FIG. 6 is a cross-sectional view of the power takeoff unit showing the PTO shaft in a locked position and the shift collar displaced axially into engagement with a 1000 RPM gear.

When the PTO shaft 58 is being removed as shown in FIGS. 3 and 4, the spring 52 continues to bias the clutch collar 32 in a distal or leftward direction until the slide pin 76 engages a distal edge or stop 88 of the longitudinal slots 78 in the output shaft 30. If it is desired to shift to high speed operation, the orientation of the PTO shaft 58 is reversed and the end portion 60 is inserted into the output shaft 30 as shown in FIGS. 5 and 6. As a result, the blunt end 62 of the PTO shaft 58 bears against the axial extension 68 of the piston 44 to positionally displace the clutch collar 32 against the force of spring 52 and into engagement with the high speed gear 18. As mentioned above, an intermediate shoulder 74 of the output shaft 30 limits the rightward axial movement of the PTO shaft 58, and the slots 78 in the output shaft 30 limit the rightward axial movement of the slide pin 76 of the clutch collar 32. In addition, the rightward axial movement of the piston 44 of the clutch collar 32 is limited by the radial step or shoulder 50 of the output shaft 30.

As will be discussed in more detail below, a locking mechanism 99 is provided for automatically locking the PTO shaft 58 into the locking position shown in FIG. 6, thereby securely maintaining the clutch collar 32 in the desired position for engagement with the high speed gear 18. To correlate the selected drive speed with the connection of the PTO shaft 58 to an associated implement, the end portion 64 of the PTO shaft 58 shown in FIG. 5 is provided with twenty (20) external splines 90 for high speed operation.

The present invention is directed to the quick-connect locking mechanism 99 for releasably locking the PTO shaft 58 in the appropriate location within the output shaft 30. A plurality of circumferentially spaced radial openings 100 (preferably three) are defined in a distal portion of the output shaft 30, preferably in the section configured with the internal splines 84. As shown in FIG. 2A, a locking detent or ball 102 is guided within each one of the radial openings 100 for radial movement relative to the axis of the output shaft 30. Preferably, the radial openings 100 are staked to create a reduced diameter at 104 near the inside diameter of the output shaft 30 in order to retain the locking balls 102 therein. The locking balls 102 are simultaneously radially movable between an inner locking position as shown in FIGS. 1, 2 and 6, and an outer unlocking position as shown in FIGS. 3 and 5.

In the inner locking position, the locking balls 102 engage an annular groove 106 formed on the splined center section 82 of the PTO shaft 58, thereby preventing relative axial movement between the PTO shaft 58 and the output shaft 30. In the outer unlocking position, the locking balls 102 are disengaged from the groove 106 in the PTO shaft 58, thereby allowing removal of the PTO shaft 58 from the output shaft 30.

To releasably maintain the locking balls 102 in the locking position, an annular collar 108 surrounds the output shaft 30 and is axially movable between an engaged first position as shown in FIGS. 1 and 2, and a disengaged second position as shown in FIG. 3. In the first position illustrated in FIGS. 1 and 2, the collar 108 is generally in alignment with the radial openings 100 in the output shaft 30 so that an inner surface 110 of the collar 108 engages and operably maintains the locking balls 102 in their inner locking position. Preferably, the collar 108 is biased axially toward the first position by a spring 112 to normally maintain the locking balls 102 in the locking position and prevent axial movement of the PTO shaft 58 relative to the output shaft 30.

As best shown in FIG. 2, the spring 112 is disposed about a terminal portion of the output shaft 30 and is surrounded and protected by an annular enclosure 114. Preferably, the enclosure 114 is made of formed steel. In the illustrated embodiment, a proximal portion 116 of the enclosure 114 is suitably attached to the collar 108, and a distal portion 118 is defined as a curled annular lip configured to slidably engage an exterior surface 120 of the output shaft 30. The spring 112 is interposed between the distal portion or lip 118 and a proximally located, annular retaining member 122 fixedly attached to the output shaft 30. Thus, the collar 108 and enclosure 114 are adapted to slide axially together as a unit along the output shaft 30 against the force or action of the spring 112.

To release the locking mechanism 99 and thereby allow the PTO shaft 58 to be removed from the output shaft 30, the collar 108 is moved out of the path of the balls 102 to the second unlocked position illustrated in FIG. 3. As shown in the illustrations, the collar 108 and enclosure 114 are manually forced as a unit in an axial proximal or rightward direction until a proximal portion 121 of the enclosure lip 118 engages the retaining member 122 on the output shaft 30. In addition, the rightward movement of the collar 108 and enclosure 114 is limited by an exterior shoulder 125 of the output shaft 130. Preferably, the collar 108 has an angled inner edge 127 and the shoulder 125 is angled to provide a secure seat for the collar 108. In this position, the locking balls 102 are permitted to move radially outward to their unlocking position disengaged from the groove 106 in the PTO shaft 58.

The operation of the foregoing preferred embodiment of the invention will now be described with reference to FIGS.

2–5. In FIG. 2, the PTO shaft 58 is in a locked position and oriented for operation at 540 rpm. In this locked position, the annular groove 106 of the PTO shaft 58 is in axial alignment with the radial openings 100 in the output shaft 30. The annular collar 108 is biased in a distal or leftward direction by the spring 112 so that the inner surface 110 of the collar 108 engages and maintains the locking balls 102 in secure locking engagement with the groove 106 of the PTO shaft 58, thus preventing relative axial movement between the PTO shaft 58 and the output shaft 30. As illustrated in FIG. 2, the collar 108 bears against the retaining member 122 and the lip 118 of enclosure 114 bears against a distal ring 123 disposed on a distal end of the output shaft 30. To provide an operating speed of 540 rpm, the PTO shaft 58 is oriented so that the end portion 64 with cavity 66 is within the output shaft 30, and the 6-splined end portion 60 is exposed for connection to an associated implement. The piston 44 of clutch collar 32 is biased distally or leftwardly by the spring 52 so that the axial extension 68 of piston 44 is received by the cavity 66 in the PTO shaft 58, and the shoulder 70 of piston 44 preferably bears against the end 72 of the PTO shaft 58. In this position, the external clutch teeth 38 of the clutch collar 32 operably engage the internal clutch teeth 42 of the low speed gear 26. Thus, when the engine clutch is engaged, the drive gear 12 (FIG. 1) drives the high speed gear 18 at a constant speed of 1000 rpm, which in turn drives the low speed gear 26 at a constant speed of 540 rpm through intermediate gear 20. Since the clutch collar 32 is only engaged with the low speed gear 26, however, the output shaft 30 and PTO shaft 58 are rotated at 540 rpm, while the high speed gear 18 freely rotates about the output shaft 30 at a speed of 1000 rpm.

If it is desired to change to an operating speed of 1000 rpm, the engine clutch is disengaged and an operator unlocks the locking mechanism 99 to release the PTO shaft 58 from its operable association with the output shaft 30. To effect this unlocking operation, the operator axially displaces the enclosure 114 against the action of the spring 112 until the proximal portion 121 of the enclosure lip 118 engages the retaining member 122 as shown in FIG. 3. This axial displacement of the enclosure 114 moves the collar 108 axially past the radial openings 100 in the output shaft 30, thereby permitting the locking balls 102 to move radially outwardly from locking engagement with the groove 102 in the PTO shaft 58. To remove the PTO shaft 58, it is pulled from the output shaft 30 while axially depressing the collar 108. When the PTO shaft 58 is pulled in a leftward axial direction as shown in FIG. 3, the groove 106 in the PTO shaft 58 acts as a cam surface which forces the locking balls 102 radially outward, thereby allowing the reminder of the PTO shaft 58 to be pulled out of the output shaft 30.

Once the locking balls 102 clear the groove 106 in the output shaft 58, the enclosure 114 can be released without inhibiting withdrawal of the PTO shaft 58. Preferably, the outer diameters of the end portions 60 and 64 of the PTO shaft 58 are less than the outer diameters of the center section 82. This allows the locking balls 102 to completely retract to their inner radial positions as shown in FIG. 4 without inadvertently engaging grooves 124 and 126 on the PTO shaft 58 which are used for attaching an implement coupling thereto.

FIG. 4 illustrates the PTO shaft 58 completely removed from the output shaft 30 with the enclosure 114 and collar 108 released. Of course, the reduced diameter or "staking" of the radial openings 100 in the output shaft 30 prevents inadvertent disassembly of the locking balls 102 from the output shaft 30. In addition, the leftward movement of the enclosure 114 and collar 108 is limited by the ring 123 and the retaining member 122.

When the PTO shaft 58 is removed, the spring 52 continues to force the clutch collar 32 in a distal or leftward axial direction in the illustrated embodiment until the slide pin 76 engages the edge 88 of the longitudinal slots 78 in the output shaft 30. In this position, the external clutch teeth 38 of the clutch collar 32 are still in operable engagement with the internal clutch teeth 42 on the low speed gear 26.

To shift to high speed operation, the orientation of the PTO shaft 58 is reversed as shown in FIG. 5, and the blunt end 62 of the PTO shaft 58 is inserted into the output shaft 30 while maintaining the enclosure 114 and collar 108 in the rightward or second unlocking position. Once the center splines 80 of the PTO shaft 58 reach the locking balls 102, the collar 108 can be released. This allows an operator to use both hands on the PTO shaft 58 to overcome the high force of the spring 52 and force the clutch collar 32 proximally or rightwardly into engagement with the high speed gear 18 as shown in FIG. 5 to condition the output shaft 30 and PTO shaft 58 for high speed operation.

When the operator releases the collar 108 and moves the PTO shaft 58 rightwardly as illustrated in FIG. 5, the spring 112 biases the collar 108 in the leftward direction against the locking balls 102. Preferably, the collar 108 is provided with an angled camming surface 130 for producing the desired action of the locking balls 102. When the groove 106 in the PTO shaft 58 becomes aligned with the radial openings 100 in the output shaft 30, the collar 108 through camming surface 130 automatically forces or "snaps" the locking balls 102 radially inwardly into locking engagement with the groove 106 in the PTO shaft 58. Accordingly, the PTO shaft 58 is locked in position and oriented so that the end portion 60 with the blunt end 62 is within the output shaft 30, and the 20-splined end portion 64 is exposed for connection to an associated implement (FIG. 6). The blunt end 62 of the PTO shaft 58 bears against the axial extension 68 of the piston 44 to position the clutch collar 32 for engagement with the high speed gear 18. In this position, the extension 68 of piston 44 is biased against the blunt end 62 of the PTO shaft 58 so that the external clutch teeth 38 of clutch collar 32 operably engage the internal clutch teeth 40 of the high speed gear 18. Since the clutch collar 32 is only engaged with the high speed gear 18, the output shaft 30 and PTO shaft 58 are rotated at 1000 rpm, while the low speed gear 26 freely rotates about the output shaft 30 at a speed of 540 rpm.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A power take-off unit of off-highway equipment such as a tractor, comprising:

an output shaft housed within the power take-off unit and adapted to be rotationally driven by gearing in said power take-off unit, said output shaft having a hollow, internally splined hub portion adapted to axially receive an externally splined power take-off shaft to prevent relative rotational movement between the power take-off and output shafts;

a locking member guided within a radial opening in the output shaft so as to be radially movable between an inner locking position, wherein said locking member is engageable with a recess formed in the power take-off shaft to prevent relative axial movement between the power take-off shaft and the output shaft, and an outer unlocking position, wherein said locking member is disengaged from said recess in the power take-off shaft to permit such relative axial movement; and an actuator positioned about an exterior of the output shaft and being movable between a first position in which the actuator operably maintains the locking member in its locking position, thus preventing axial movement of the power take-off shaft relative to the output shaft, and a second position which permits radial movement of said locking member to its unlocking position, thus allowing the power take-off shaft to be removed from the output shaft.

2. The power take-off unit of claim 1 wherein the recess is located on a generally centralized exterior surface portion of the power take-off shaft, and is generally centralized relative to opposite ends of said power take-off shaft.

3. The power take-off unit of claim 1 further comprising a plurality of locking balls supported for radial movement within respective circumferentially spaced radial openings in the output shaft.

4. The power take-off unit of claim 3 wherein said plurality of locking balls comprises three equally spaced balls supported within respective equally spaced radial openings in the output shaft.

5. The power take-off unit of claim 3 wherein the recess in the power-take-off shaft is defined as an annular groove, whereby the locking balls are simultaneously radially movable between said inner locking position in which the locking balls are engageable with said groove to prevent relative axial movement between the power take-off shaft and the output shaft, and said outer unlocking position in which the locking balls are disengaged from said groove to permit such relative axial movement.

6. The power take-off unit of claim 1 wherein the actuator comprises an axially movable annular collar surrounding the output shaft.

7. The power take-off unit of claim 1 further comprising a bias member adapted to bias the actuator toward said first position.

8. The power take-off unit of claim 7 wherein the bias member comprises a spring surrounding a distal portion of the output shaft.

9. The power take-off unit of claim 8 further comprising an annular enclosure surrounding an exterior of said spring and engaging the actuator and output shaft.

10. The power take-off unit of claim 9 wherein the annular enclosure is connected to the actuator for movement therewith and is adapted to slidably engage an exterior surface of the output shaft.

11. The power take-off unit of claim 10 wherein the spring is interposed between said distal portion of the annular enclosure and a proximally located spring retaining member on the output shaft, whereby axial movement of said actuator from the first to the second position causes slidable movement of the annular enclosure along the output shaft and against the axial action of the spring.

12. The power take-off unit of claim 11 wherein the spring retaining member acts as a proximal stop for limiting sliding movement of the annular enclosure in a proximal direction, and a distal stop is provided on the output shaft for limiting sliding movement of the annular enclosure in a distal direction.

13. A power take-off unit of off-highway equipment such as a tractor, comprising:

an output shaft housed within the power take-off unit and adapted to be rotationally driven by gearing in said power take-off unit, said output shaft having a hollow, internally splined hub portion adapted to axially receive an externally splined power take-off shaft to prevent relative rotational movement between the power take-off and output shafts;

a plurality of circumferentially spaced locking balls guided within respective spaced radial openings in the output shaft so as to be simultaneously radially movable between inner locking positions, wherein said locking balls are engageable with an annular groove formed on the power take-off shaft to prevent relative axial movement between the power take-off shaft and the output shaft, and outer unlocking positions, wherein said locking balls are disengaged from said groove in the power take-off shaft;

an annular collar surrounding the output shaft and being axially movable between a first position in which an inner surface of the collar is generally in alignment with the radial openings in the output shaft to engage and operably maintain the locking balls in their inner locking position, and a second axially displaced position to permit outward radial movement of said locking balls to their outer unlocking position; and a bias member adapted to bias the collar toward the first position to normally maintain the collar in locking engagement with the locking balls.

14. The power take-off unit of claim 13 wherein the recess is located on a center portion of the power take-off shaft.

15. The power take-off unit of claim 13 wherein said plurality of locking balls comprises three equally spaced balls supported within respective equally spaced radial openings in the output shaft.

16. The power take-off unit of claim 15 wherein the bias member comprises a spring surrounding a distal portion of the output shaft.

17. The power take-off unit of claim 16 further comprising an annular enclosure surrounding an exterior of said spring and engaging the collar and output shaft.

18. The power take-off unit of claim 17 wherein the annular enclosure is connected to the collar for movement therewith and is adapted to slidably engage an exterior surface of the output shaft.

19. The power take-off unit of claim 18 wherein the spring is interposed between said distal portion of the annular enclosure and a proximally located spring retaining member on the output shaft, whereby axial movement of said collar from the first to the second position causes slidable movement of the annular enclosure along the output shaft and against the axial action of the spring.

20. The power take-off unit of claim 19 wherein the spring retaining member acts as a proximal stop for limiting sliding movement of the annular enclosure in a proximal direction, and a distal stop is provided on the output shaft for limiting sliding movement of the annular enclosure in a distal direction.

21. In combination with a power take-off unit of a tractor having an output shaft for delivering power to agricultural implements and a reversible power take-off shaft releasably fixed to said output shaft, said output shaft having a hollow, internally splined hub portion adapted to axially receive an externally splined center section of the power take-off shaft to prevent relative rotational movement therebetween, a locking mechanism comprising:

said output shaft having a plurality of circumferentially spaced radial openings formed in said hub portion;

said power take-off shaft having an annular groove formed in the splined center section and being positionable within the hollow hub portion of the output shaft such that the groove is generally in alignment with the radial openings;

a plurality of locking balls supported within respective ones of said radial openings for radial movement relative to the axis of the output shaft;

an annular collar surrounding the output shaft and being axially movable between a first position in which an inner surface of the collar is generally in alignment with the radial openings in the output shaft to engage and operably maintain the locking balls in their inner locking position, and a second axially displaced position to permit outward radial movement of said locking balls to their outer unlocking position; and a spring surrounding a distal portion of the output shaft and being interposed between the collar and the output shaft to bias the collar toward the first position to normally maintain the collar in locking engagement with the locking balls;

whereby the collar is axially movable against the action of the spring from said first position to said second position to permit outward radial movement of said locking balls to their unlocking position, thereby allowing removal of the power take-off shaft from the output shaft.

22. The mechanism of claim 21 further comprising an annular enclosure surrounding an exterior of said spring, a proximal portion of the annular enclosure being connected to the collar and a distal portion of the annular enclosure adapted to slidably engage an exterior surface of the output shaft.

23. The mechanism of claim 22 wherein the spring is interposed between said distal portion of the annular enclosure and a proximally located spring retaining member on the output shaft, whereby axial movement of said collar from the first to the second position causes slidable movement of the annular enclosure along the output shaft and against the axial action of the spring.

24. The mechanism of claim 23 wherein the spring retaining member acts as a proximal stop for limiting sliding movement of the annular enclosure in a proximal direction, and a distal stop is provided on the output shaft for limiting sliding movement of the annular enclosure in a distal direction.

* * * * *